May 18, 1965 A. W. HOLT 3,184,712

CORE CORRELATION MATRIX READER

Filed June 6, 1961 2 Sheets-Sheet 1

INVENTOR
Arthur W. Holt

BY Joseph A. Genovese & Max L. Libman

ATTORNEYS

INVENTOR
Arthur W. Holt
BY Joseph A. Genovese & Max L. Libman
ATTORNEYS 3,184,712

CORE CORRELATION MATRIX READER

Arthur W. Holt, Silver Spring, Md., assignor, by mesne assignments, to Control Data Corporation, Minneapolis, Minn., a corporation of Minnesota Filed June 6, 1961, Ser. No. 115,256
3 Claims. (Cl. 340—146.3)

This invention relates to reading machines and more particularly to character recognition machines using the correlation technique to aid in deciding upon the identity of each character.

Patent No. 3,104,369 describes a reading machine which has a resistor correlation matrix for each character that is to be identified. Each matrix functions as a voltage summarizing device for signals derived from selected scanner output. Character identity is based on the output voltages of the resistor matrices.

An object of this invention is to provide improvements in character reading machines using such correlation techniques. Instead of using resistor matrices, I find that it is advantageous to summarize currents instead of voltages, and at the same time reduce the number of components required in the correlation devices. According to one aspect of my invention, I provide a single magnetizable element, e.g. a soft core, for each character. The single core with its windings serves the function of all of the resistors required in a single character-correlation matrix disclosed in the above patent.

Patent No. 3,104,369 discloses "assertion," "negation" and "weighting position" techniques which greatly facilitate the recognition of characters. Briefly, an "assertion" may be defined as a signal indicating the presence of a portion of a character where it is expected. "Negation" is a signal identifying a portion of the character background where only the background is expected, thereby providing the logical conclusion that the unknown character does not and must not have a feature in a given location. In other words, to distinguish between an "E" and an "F," the lower horizontal information points of the "E" are most important. Thus corresponding points for the "F" are negated, meaning that for the machine to recognize the "F," there must be a group of vertical points, an upper and an intermediate horizontal group of points connected to the vertical points, and the absence of character-information points in the lower horizontal position. The weighting technique simply assigns greater weight or credence to specific positions which are of greater importance in determining the identity of a character. An O and a Q are distinguished from each other only by the presence or absence of the small tail at the lower right-hand corner. The positions corresponding to the small tail are of great importance in determining whether the unknown character is an O or a Q. Therefore, for the O, the position occupied by the tail of the Q would be "negated," and the negation signal may be "weighted" because of its importance. For the Q identity, the converse would be true, i.e. the tail-occupying-station assertions would be used, and these, also, are preferably weighted.

The reading machine described in the above patent may use a temporary storage, preferably but not necessarily, made of flip flops or equivalent bistable devices. Each flip flop has a pair of outputs which swing around an arbitrarily selected reference, for example from +6 to −6 volts. By using two separate outputs, assertion and negation wires are available for connection with the resistors of the correlation matrices. According to one form of my present invention I may use the same technique, relying on the same wiring connections from the flip flops to furnish signals for the cores. However, by current correlation and the adoption of a single core for each character, my present invention provides greater flexibility.

Initially, I can develop assertion and negation values from a single-output flip flop (or the equivalent), instead of a two-output flip flop, by merely winding all assertion outputs in one direction on the core and all negation windings in the other direction. The directions of the magnetic fields resulting from the windings will cause the fields to automatically summarize and produce the effect of assertions and negations.

Going a step further with the simplification, it is possible to eliminate the temporary storage in a correlation machine such as disclosed in U.S. Patent No. 3,104,369. For example, in machines using a mosaic of photocells as the scanner, the scanner outputs may be amplified and applied directly to the cores, taking into account assertions, negations and weighted positions by the direction and number of windings on the individual cores.

Accordingly, another object of my invention is to materially simplify reading machines using correlation techniques by measurements of current in the correlation section thereof.

Although I have illustrated machines having a scanner made of photocells in a vertical row for "line-scanning" and a mosaic of photocells for a "full-examination" scan, it is to be understood that the "scanning" may be on a full character-examination basis or a line-by-line or element-for-element basis. Further, the illustration of a multi-photocell scanner is a mere convenience, it being understood that any type of scanning could easily be substituted, and that my core correlation matrix and logical connection with scanner outputs are independent of the specific type of scanner.

Other objects and features will become apparent in following the description of the illustrated forms of the invention.

Figures 3, 3A:
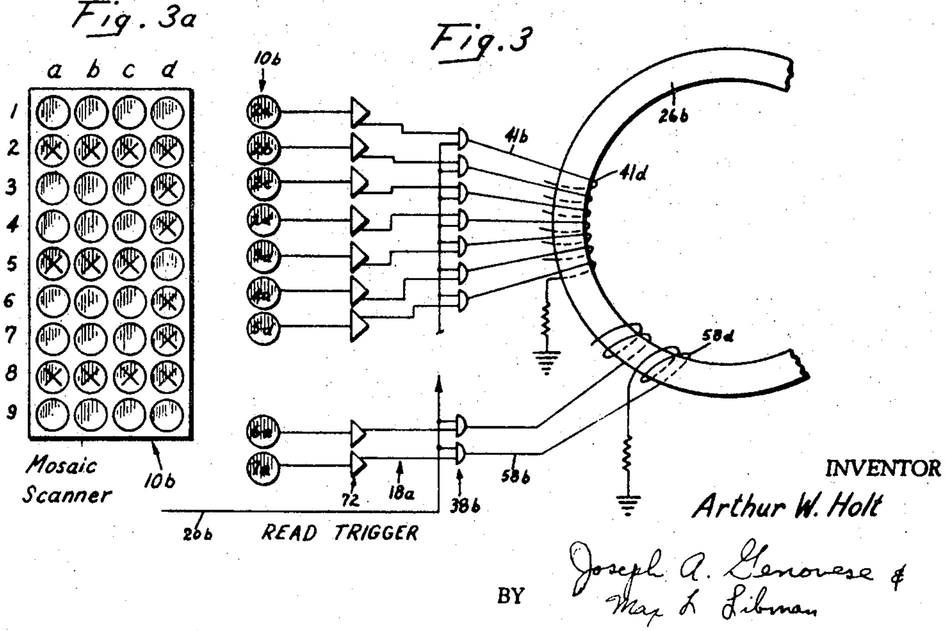
FIGURE 3 is a fragmentary diagrammatic view similar to FIGURE 2 but showing a modification.

FIGURE 3*a* is a mosaic scanner which may be used with the modification of FIGURE 3.

Figures 1, 4, 4A, 5:
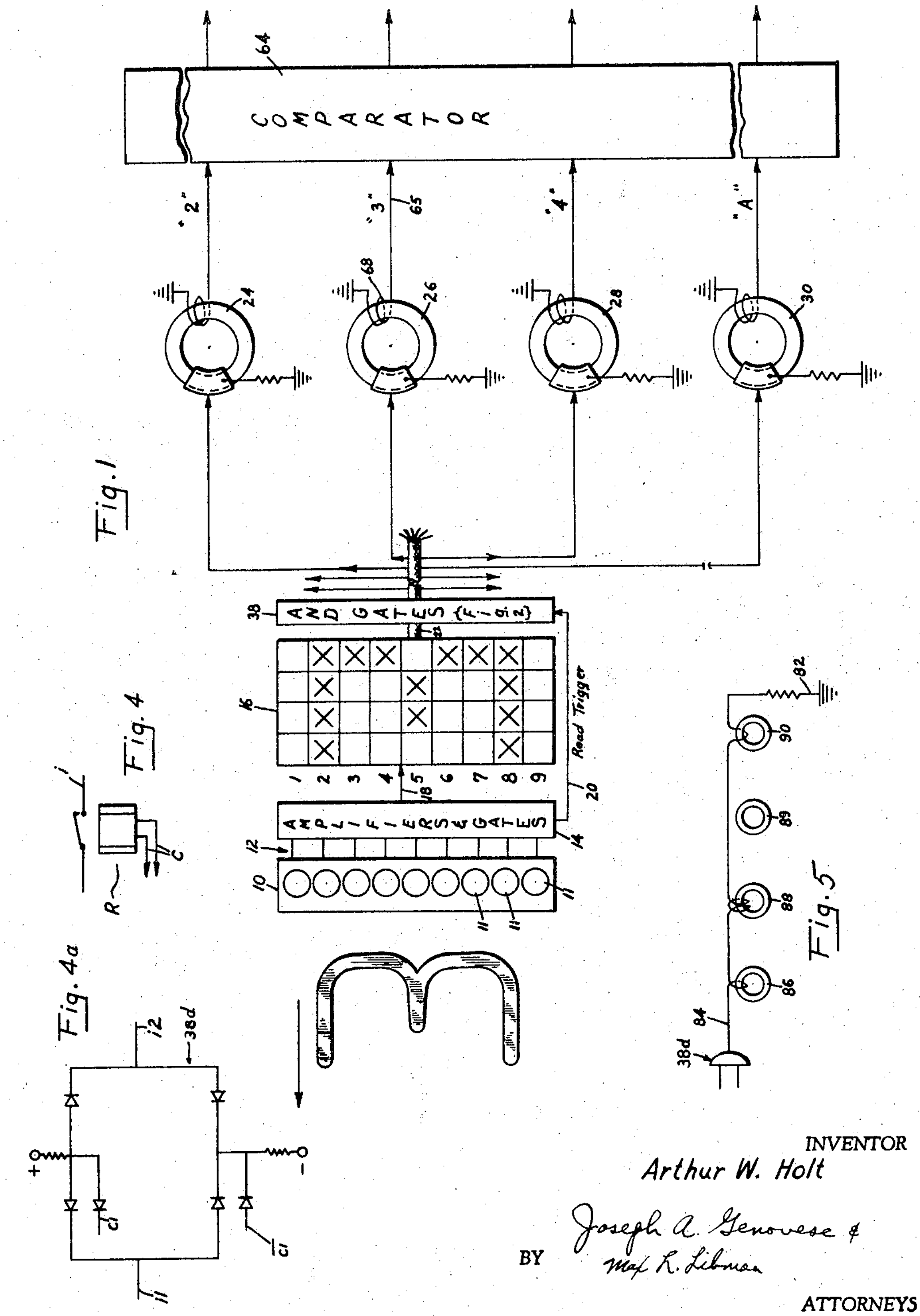
FIGURE 1 is a diagrammatic view showing a reading machine system incorporating the principles of my invention.

FIGURES 4–4*a* are views showing various forms of gating.

FIGURE 5 is a view showing several cores driven from the same signal source.

In the accompanying drawings, FIGURE 1 discloses a reading machine system analogous to the system in Patent No. 3,104,369. As will be seen later, my invention is not restricted to that type of machine. The machine system of FIGURE 1 up to and including register 16 may be identical to the above patent. For a complete explanation, reference is made to the patent. FIGURE 1 shows a scanner 10 for unknown characters on a background. Assuming that the character image (dark) and its background (white) moves in the direction of the arrow across the row of photocells 11 of scanner 10, the scanner will provide information outputs to a group of amplifiers over conductors 12 diagrammatically shown as lines connecting each photocell of the scanner with amplifiers and a gating system 14. The outputs of the gates are applied to a temporary storage 16 made of columns and rows of bistable devices, e.g. flip flops. Although the output lines of the gates individually feed the flip flops forming the columns and rows, I have diagrammatically shown the necessary connections by a single line 18. The scanner outputs are gated into columns *a*, *b*, *c* and *d*, and rows 1–9 respectively, in accordance with timing or clock signals coordinated with the speed of character movement. Consequently, when the character "3" is fully scanned, the image of the character occurs in the memory 16 by setting certain of the flip flops and leaving the others in a reset (initial) state. The "set" flip flops for the scanned "3" are indicated by X's in register 16. At the end of a character a read trigger signal is developed on line 20 which is used to interrogate the register 16 and provide output signals on which to base a character-identity decision. The preceding description is merely a summary of corresponding features found in Patent No. 3,104,369.

Figure 2:
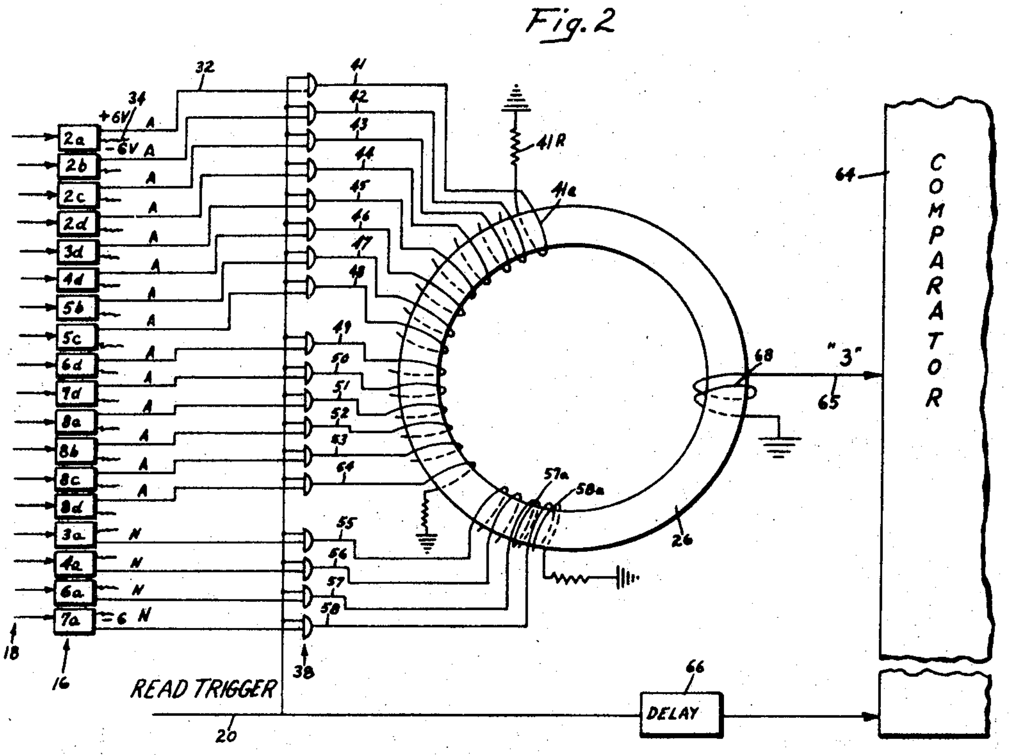
FIGURE 2 is a diagrammatic view showing one core stage of the correlation matrix of the machine system of FIGURE 1.

The output wires of the flip flops in memory 16 are used to provide signal voltages to resistor matrices in the patent. I have shown cable 22 in FIGURE 1 to diagrammatically represent similar wires. More of the wires are shown in FIGURE 2 and will be discussed in more detail subsequently. My present invention eliminates the resistor matrices containing a plurality of resistors for each character. I have substituted a magnetic core for each resistor matrix. For instance, there are individual cores 24, 26, 28 and 30 (FIGURE 1) for the characters 2, 3, 4 and A. In actual practice, there will be at least ten cores if the reading machine is for numerals only. There will be more cores if the reading machine is designed for numerals and letters or only letters. FIGURE 2 shows core 26 for the numeral "3," the flip flops of storage 16 used in the identity of the character 3, and the wiring connections between the core and the flip flops. Lines 18 are the input lines from gates 14, and the flip flops are identified by position in the memory 16. It is understood that the output wires of at least some of the flip flops shown in FIGURE 2 will be common to cores other than core 26 (e.g., see FIGURE 5). However, to simplify FIGURE 2, I have shown the wires from the flip flops for only core 26.

As referred to previously, each flip flop, for example flip flop **2*a* has two outputs on wires 32 and 34 respectively. When the photocell of scanner 10 associated with flip flop 2*a* sees darkness, i.e. a portion of the image of the character, flip flop 2*a* will be "set" so that the signals on lines 32 and 34 will swing around an arbitrary reference, e.g. zero volts. Wire 32 will then have a positive signal such as six volts, whereas wire 34 will have a negative signal, such as minus six volts. If I want to logically separate characters, I can arrange my system so that certain photocells, and consequently certain flip flops, seek the background as opposed to a portion of the character at elemental subarea stations of the character. This is the "negation" technique, previously described. Positions 3*a*, 4*a*, 6*a* and 7*a* are important to distinguish the character "3" from an "8," as can be visualized by examining register 16 in FIGURE 1. Therefore, I have selected the negation wires (N) of flip flops 3*a*, 4*a*, 6*a* and 7*a* to help identify the "3." When the photocells of scanner 10 associated with these flip flops see "white" there will be a positive signal on the lower wire which is used. The logic is that for determination of the character 3, the identified positions (in FIGURE 2) 2*a*, 2*b*, 2*c*, 2*d*, 3*d*, 4*d*, 5*b*, 5*c*, 6*d*, 7*d*, 8*a*, 8*b*, 8*c*, 8*d*, must see the character or its image and also, positions 3*a*, 4*a*, 6*a* and 7*a*** must see the character background which is usually white.

The signals on the selected assertion wires 32 and negation wires N (FIGURE 2) are fed to a group of AND gates 38 which are interrogated simultaneously by a read trigger signal on line 20. This signal is developed by recognizing the clear white space between adjacent characters of a line or in any other known way as described in the referenced patent. Therefore the line 20, constitutes a single input of the two-input analog AND gates 38, while the individual assertion and negation wires 32 and N form respective inputs to the gates 38.

The analog gates 38 can be constructed in many ways to operate much like a relay R (FIGURE 4) where the control signal is applied to line *c* to allow the information signal on line *i* to pass. The signal on line *i* may be of any value and polarity. Electronic gates can be constructed the same as the diode AND gate of U.S. Patent No. 2,932,006, except the gate is made to conduct either negative or positive signals. For instance, gate **38*d*** of FIGURE 4*a* is made of two diode gate sections, each the same as in the above patent, connected in parallel by information line *i*1 and *i*2. One section looks for negative information signals and the other looks for positive signals, with the control signal applied at *c*1 and the inversion of the control signal applied at $\overline{c1}$. The analog gating could also be achieved by other circuits, e.g. using bidirectional transistors or field effect transistors which have parts which correspond to the anode, cathode and grid of a vacuum tube. Since, I did not invent the specific circuits of the gating, a more detailed discussion is not given.

Continuing now with the description of FIGURE 2, the output lines 41–58 inclusive of gates 38 are wound on or attached to coils on core 26. For the purpose of illustration, winding **41*a* is shown going to ground through resistor 41R, it being understood that all other windings will similarly terminate to have easily measurable currents in the cores. Since the assertion and negation decision is automatically made by selection of wires 32 or N (having correct positive or negative current signals) at the output of the flip flops, all windings on core 26 are in the same direction. It will be seen in connection with the description of FIGURE 3, that I can use the windings themselves to obtain the assertion and negation selection. The weighted positions are established by using additional windings, for instance note that windings 57*a* and 58*a*** each have two turns whereas the other windings have single turns.

The decision regarding the identity of the characters is made by comparator 64 which has a single input line 65 for each core. The comparator is triggered by the "read" trigger signal on line 20 through a delay 66 (shown only in FIGURE 2). A readout coil 68 is wound on typical core 26 (FIGURES 1 and 2) to obtain a signal proportional to the flux field in core 26 at the instant of readout. Comparator 64 is merely a signal measuring and selection network similar to the "match voltage selector" in Patent No. 3,104,369.

In the operation of this phase of my invention, it is assumed that the flip flops shown in FIGURE 2 are set and the others of register 16 remain in their initial state. The flip flops in FIGURE 2 will provide outputs on their lines 32 and N, and the lines selected are connected to the gates 38. When the read trigger signal is developed on line 20, the gates 38 will provide outputs, for example pulses, to the windings **41*a*–58*a* respectively. Each winding will have a given current. Those representing weighted positions have two or more windings. Consequently, electromagnetic fluxes about each winding will generate a flux field in or about core 26. In view of this field, pickup coil 68 will acquire a corresponding induced current when the field is either collapsed or generated (upon interrogation of gates 38), and thus current is conducted on line 65 to comparator 64. Since all of the cores 24, 26, 28, 30, etc., are interrogated simultaneously by the read trigger signal being applied to gates 38** for each core, the cores for all of the characters are simultaneously examined. The comparator selects the "most favorable" signal or a signal that meets certain requirements, as the character-identity signals. The "most favorable" signal can be the "highest," the "lowest" or the nearest to an arbitrary reference, depending on engineering design of the system. By this I mean that my invention is not limited to one type of comparator, and/or decision section (none specifically shown) of a reading machine. At present there are two general types of decision sections, i.e. "best of match" and "absolute," either of which is compatible with my invention.

Attention is now directed to FIGURES 3 and **3*a*. Core 26*b* corresponds to core 26, and trigger line 20*b* corresponds to line 20, while gates 38*b* respond to gates 38. In this form of my invention I have eliminated the temporary storage or memory 16. Instead, I have reproduced certain of the photocells of matrix type scanner 10***b* (FIGURE 3*a*) and identified them according to position in a single matrix for a single examination of the entire character. The arrangement of photocells in a matrix may be very similar to that disclosed in the Fitch Patent No. 2,682,043. The outputs of the photocells are amplified at 72. Lines 18*a* from the amplifiers constitute individual inputs to gates 38*b*. In this variation of my invention, the amplifiers may provide outputs of either a positive or a negative sense (not shown) depending on whether the photocells see black or white. However, as shown in FIGURE 3, the amplifiers provide positive current output signals on lines 41*b*–58*b* when their photocells detect a part of the character image. The coils for the assertion signals are wound clockwise on the core, and the coils for the negation signals are wound counterclockwise. Thus, the signals will all be of the same sense when certain photocells see the character image and others (*7a* and *6b* as shown) see part of the image background. Here again, the weighted positions are established by increasing the number of windings in the coils. When current flows through the coils 41*d*–58*d* (upon read signal on line 20*b*) magnetic fields are induced in the core 26*b*, and these are summarized and read out the same as in FIGURE 2.

The various coils of the various cores can be connected in series (FIGURE 5), so that the output of an AND gate can be fed serially to several cores. In this case, the AND gates 38*d* would be designed to provide constant current independent of the number of cores served. Or, instead, special loading circuits can be used to equalize the impedances in all of the circuits. FIGURE 5 shows one gate 38*d* and a single output wire 84 which is coiled around cores 86, 88 and 90, each of which is a character-identity core. It is understood that the character-identity output wires for the cores are not shown, nor are the various additional information coils on the cores. FIGURE 5 is intended to show the serial connections, the assertion winding (on core 86), the double coil weighting (on core 88), the selectivity of cores (not using core 89), and the negation coil (wound on core 90 in a direction opposite to the winding on core 86). It is obvious that I can use a combination system having some serial connections and some parallel connections with predetermined cores.

It is noted that certain forms of my invention are well suited for analog processing of the data derived from character examination by simply using linear amplifiers. Thus, if one or more of the photocells see the character image as a shade of gray as opposed to almost black, the output of its amplifiers will be proporitonal to the optical density of the gray. For such a system, the gates, for instances gates 38*b*, will be analog AND gates instead of digital. In either arrangement the operation of the reading machine is similar.

It is understood that various changes, modifications, alterations and the like may be made without departing from the invention as claimed.

I claim:

1. In an optical character reading machine having an examination device provided with means for examining the elemental areas of an unknown character and its background, and means responsive to said examining means for providing outputs which correspond to the optical densities of said elemental areas, the improvement comprising conductors connected to said output providing means, magnetic correlation means to provide criteria with which an examined character represented by the outputs on selected conductors is correlated to ascertain the identity of the examined character, said magnetic means including a magnetic core for each character, a set of said conductors connected by windings with a core for one character, additional sets of said conductors including at least some conductors which are different from those of the other sets connected by windings with the remaining cores so that the criteria for each character is established by the selection of conductors and their windings on said cores, said outputs on said conductors inducing magnetic fields about said cores of a strength corresponding to the degree of match between an unknown examined character and the particular conductors of said sets associated with each core, and flux responsive means connected with said cores to provide comparison signals on which to base a decision as to the identity of the unknown character.

2. The optical character reading machine of claim 1 wherein said at least some conductors include conductors of examination-device outputs corresponding to elemental areas where the character is expected and having their windings wound in a first direction, and other conductors of said outputs corresponding to elemental areas where the character background is expected, and the last mentioned conductors having their windings wound in a direction opposite to said first direction.

3. The optical character reading machine of claim 1 wherein said outputs providing means include a set of gates, a trigger signal conductor forming an enabling input to each gate, and said conductors being the output lines of said gates.

References Cited by the Examiner

UNITED STATES PATENTS

| | | | |
|---|---|---|---|
| 2,691,153 | 10/54 | Rajchman et al. | 340—174 |
| 3,102,995 | 9/63 | Abbott et al. | 340—146.3 |

MALCOLM A. MORRISON, *Primary Examiner.*

NEIL C. READ, *Examiner.*